(12) United States Patent
Sato (10) Patent No.: US 9,537,860 B2
(45) Date of Patent: Jan. 3, 2017

(54) DISPLAY CONTROL APPARATUS, DISPLAY CONTROL METHOD AND SERVER SYSTEM

(71) Applicant: Kabushiki Kaisha Toshiba, Minato-ku, Tokyo (JP)

(72) Inventor: Jun Sato, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 178 days.

(21) Appl. No.: 14/458,607

(22) Filed: Aug. 13, 2014

(65) Prior Publication Data

US 2015/0082038 A1 Mar. 19, 2015

Related U.S. Application Data (60) Provisional application No. 61/879,592, filed on Sep. 18, 2013.

(51) Int. Cl.
H04L 29/06 (2006.01)

(52) U.S. Cl.
CPC ....... H04L 63/0869 (2013.01); H04L 63/0428 (2013.01); H04L 63/062 (2013.01)

(58) Field of Classification Search
CPC . H04L 63/0869; H04L 63/0428; H04L 63/062
See application file for complete search history.

(56) References Cited

U.S. PATENT DOCUMENTS 7,505,955 B2 * 3/2009 Watanabe ............... G06F 21/10
7,685,071 B2 * 3/2010 Terauchi ............... H04L 9/0872
380/247

(Continued)

FOREIGN PATENT DOCUMENTS

| JP | 2006 217434 A | 8/2006 |
| JP | 2010-199879 A | 9/2010 |
| JP | 2011-120209 A | 6/2011 |

OTHER PUBLICATIONS

Panasonic, Samsung, Sony, Toshiba—Introducing Next Generation Secure Memory Technology, NSM_White_Paper_20121116r2— 17 pages.

(Continued)

*Primary Examiner* — Joseph P Hirl
*Assistant Examiner* — Stephen Gundry
(74) *Attorney, Agent, or Firm* — Knobbe, Martens, Olson & Bear LLP (57) ABSTRACT

A display control apparatus performs download processing and streaming processing. In the download processing, after first mutual authentication between removable media and a license server, the removable media receive and store a first title key from a license server and first encrypted content from a content server. In the streaming processing, the removable media and the license server perform second mutual authentication, the removable media receive and store a second title key and a content address from the license server, the removable media and the display control apparatus perform third mutual authentication, the display control apparatus acquires the second title key and the content address recorded on the removable media, the display control apparatus streams and receives second encrypted content from the content server, and the display control apparatus decodes the streamed-and-received second encrypted content using the second title key, and streams and reproduces the decoded second encrypted content.

7 Claims, 9 Drawing Sheets

(56) References Cited

U.S. PATENT DOCUMENTS

| | | | | |
|---|---|---|---|---|
| 8,571,994 B2* | 10/2013 | Robert | G06F 21/10 | 705/51 |
| 8,584,257 B2* | 11/2013 | Kortum | H04N 7/1675 | 726/2 |
| 8,595,141 B2* | 11/2013 | Hao | H04N 21/47202 | 705/59 |
| 8,701,145 B1* | 4/2014 | Berger | H04N 21/4147 | 725/32 |
| 8,718,445 B1* | 5/2014 | Berger | G06Q 30/0261 | 386/239 |
| 8,826,135 B1* | 9/2014 | Durham | H04N 21/00 | 715/716 |
| 8,892,648 B1* | 11/2014 | Durham | G06Q 50/01 | 709/204 |
| 9,173,090 B2* | 10/2015 | Tuchman | H04W 8/265 | |
| 9,264,773 B2* | 2/2016 | Busse | H04N 21/4532 | |
| 2002/0161996 A1* | 10/2002 | Koved | G06F 21/10 | 713/150 |
| 2005/0086501 A1* | 4/2005 | Woo | G06F 21/10 | 713/189 |
| 2005/0246282 A1* | 11/2005 | Naslund | H04L 63/0428 | 705/52 |
| 2006/0129514 A1* | 6/2006 | Watanabe | G06F 21/10 | |
| 2006/0195515 A1* | 8/2006 | Beaupre | G06F 17/30766 | 709/203 |
| 2007/0124245 A1* | 5/2007 | Sato | G06F 21/10 | 705/50 |
| 2007/0203839 A1* | 8/2007 | Terauchi | H04L 9/0872 | 705/51 |
| 2007/0214370 A1* | 9/2007 | Sato | H04N 7/1675 | 713/193 |
| 2007/0263865 A1* | 11/2007 | Cohen | G11B 27/034 | 380/201 |
| 2009/0012935 A1* | 1/2009 | Beged-Dov | G06F 17/30038 | |
| 2010/0125511 A1* | 5/2010 | Jouret | G06F 21/10 | 705/26.1 |
| 2010/0131346 A1* | 5/2010 | Morgan | G06Q 30/02 | 705/14.25 |
| 2011/0138486 A1 | 6/2011 | White | | |
| 2011/0202430 A1* | 8/2011 | Narayanan | G06Q 10/10 | 705/27.1 |
| 2011/0225496 A1* | 9/2011 | Jeffe | G11B 27/034 | 715/716 |
| 2011/0238495 A1* | 9/2011 | Kang | G06Q 30/02 | 705/14.49 |
| 2011/0238520 A1* | 9/2011 | Selley | G06Q 20/102 | 705/26.3 |
| 2011/0283232 A1* | 11/2011 | Jordan | H04N 5/44543 | 715/810 |
| 2012/0210340 A1* | 8/2012 | Reynolds | H04N 21/2543 | 725/23 |
| 2012/0240240 A1* | 9/2012 | Naslund | H04L 63/0428 | 726/26 |
| 2013/0125175 A1* | 5/2013 | Hao | H04N 21/47202 | 725/62 |
| 2013/0191626 A1* | 7/2013 | Kuno | H04L 63/0428 | 713/150 |
| 2013/0332839 A1* | 12/2013 | Frazier | H04N 21/4532 | 715/738 |
| 2014/0006951 A1* | 1/2014 | Hunter | H04H 60/31 | 715/719 |
| 2014/0071259 A1* | 3/2014 | Odou | A61B 8/0866 | 348/77 |
| 2014/0096215 A1* | 4/2014 | Hessler | H04L 63/0869 | 726/7 |
| 2014/0186010 A1* | 7/2014 | Guckenberger | G11B 27/031 | 386/248 |
| 2014/0219630 A1* | 8/2014 | Minder | G11B 27/005 | 386/241 |
| 2014/0355955 A1* | 12/2014 | Berger | G06Q 30/00 | 386/248 |
| 2015/0074721 A1* | 3/2015 | Fishman | H04N 21/8545 | 725/45 |
| 2015/0095460 A1* | 4/2015 | Berger | H04L 67/06 | 709/219 |

OTHER PUBLICATIONS

Marlin Simple Secure Streaming (MS3), Marlin Developer Community, MDC_MS3_whitepaper_100707—4 pages.

* cited by examiner

DISPLAY CONTROL APPARATUS, DISPLAY CONTROL METHOD AND SERVER SYSTEM

FIELD

An embodiment of this invention relates to a display control apparatus, a display control method and a server system for controlling display of a graphical user interface about content receiving.

BACKGROUND

There is an art in which a right server for delivering right information about content and removable media having a copyright protection function to the recorded content directly perform mutual authentication through a reproducing device capable of record and reproduction on the removable media. In this art system, the encrypted content and the right information had by the server are directly downloaded and saved to the removable media and then, the reproducing device and the removable media perform mutual authentication and while reading the encrypted content from the removable media, the cipher is decoded to thereby reproduce the content.

DETAILED DESCRIPTION

According to one embodiment, a display control apparatus which outputs video to a display screen includes a processor, a communication module, a connecting module, a receiver, a generator, a display controller and an accepting module. The communication module communicates with a network. The connecting module makes a connection to removable media having a content protection function. The receiver receives data of a web page from a web page delivery server using the communication module. The web page includes a first object for accepting instructions to start download processing based on a first agreement and a second object for accepting instructions to start streaming processing based on a second agreement. The generator generates an image of the web page including an image of the first object and an image of the second object based on the received data of the web page using the processor. The display controller displays the image of the web page on a display device. The accepting module accepts a manipulation with respect to the image of the first object or the image of the second object. The download processing includes first, third and fourth processing. The removable media and a license server connected to the network perform first mutual authentication through the communication module in the first processing. When the first mutual authentication succeeds, the removable media receive a first title key sent from a license server through the communication module and write said first title key in its own recording area in the third processing. The removable media receive first encrypted content sent from a content server connected to the network through the communication module and write said first encrypted content in its own recording area in the fourth processing. The streaming processing includes fifth, sixth, seventh, eighth, ninth and tenth processing. The removable media and the license server perform second mutual authentication through the communication module in the fifth processing. When the second mutual authentication succeeds, the removable media receive a second title key and a content address sent from the license server through the communication module and write said second title key and said content address in the recording area in the sixth processing. The removable media and the display control apparatus perform third mutual authentication in the seventh processing. When the third mutual authentication succeeds, the display control apparatus acquires the second title key and the content address recorded on the removable media in the eighth processing. The display control apparatus streams and receives second encrypted content from the content server using the content address in the ninth processing. The display control apparatus decodes the streamed-and-received second encrypted content using the second title key, and streams and reproduces the decoded second encrypted content in the tenth processing.

Various embodiments will be described hereinafter with respect to the accompanying drawings.

Figure 1:
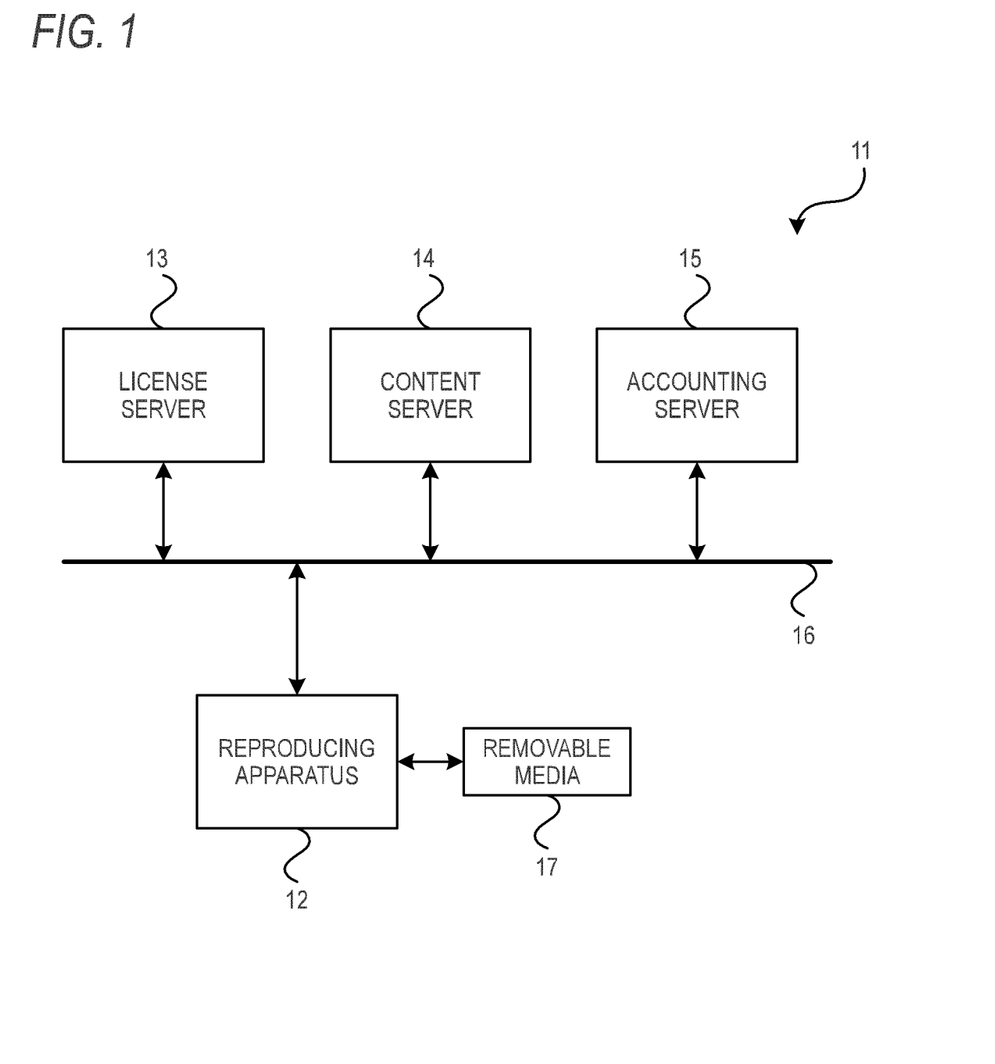
FIG. 1 is a block configuration diagram showing one example of a content reproducing system as an embodiment.

An embodiment will hereinafter be described with reference to the drawings. FIG. 1 shows an outline diagram of one example of a content reproducing system 11 described in this embodiment. This content reproducing system 11 is constructed by connecting a reproducing apparatus 12, a license server 13, a content server 14, an accounting server 15, etc. to a network 16 such as the Internet.

It is assumed that the reproducing apparatus 12 among them is, for example, a digital television broadcast receiver incorporating a video output screen, a speaker, etc. or an STB (set top box) capable of making connection to an external video display, a speaker, etc. And, this reproducing apparatus 12 can communicate with the license server 13, the content server 14 and the accounting server 15 through the network 16. Also, removable media 17 such as an SD (Secure Digital) memory card can be connected to this reproducing apparatus 12. A connection form includes various forms, for example, a slot type, a tray type, a wired type or a wireless type. In addition, the present embodiment describes the case of connecting the removable media 17 to the reproducing apparatus 12, but non-removable recording media may be connected to the reproducing apparatus 12 and the recording media may execute processing similar to that of the removable media 17 described below.

The license server 13 provides the reproducing apparatus 12 with, for example, right information including a usage rule in which license conditions of content are described, or a cipher key for decoding encrypted content. Also, the content server 14 stores encrypted content or a web page indicating a content list capable of streaming or download, and provides the reproducing apparatus 12 with these content or the web page. Further, the accounting server 15 performs accounting processing on a user, for example, in the case of requesting viewing of pay content. In addition, the license server 13, the content server 14 and the accounting server 15 are separately formed, but may be formed as the same server. Also, a certain server may combine a function of another server and by way of example, the accounting server 15 may have a function of storing and delivering a web page. In this case, the accounting server 15 may receive notification (step S12) of content decision from the reproducing apparatus 12 as described below in FIGS. 5 to 7. Also, each of the license server 13, the content server 14 and the accounting server 15 may be one device in which a configuration is housed in one cabinet, or may be a server group in which plural devices are connected by an intranet etc.

Figure 2:
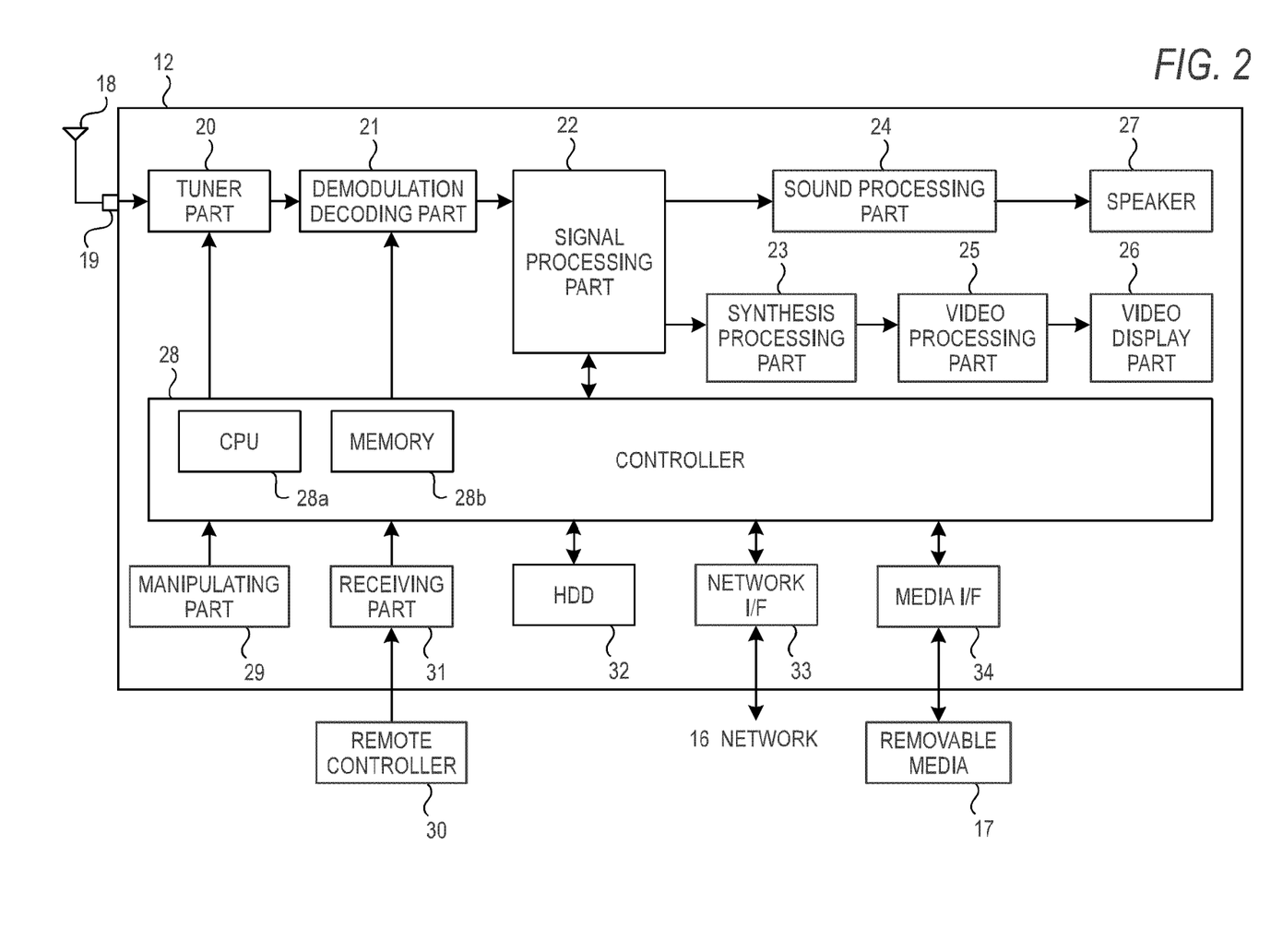
FIG. 2 is a block configuration diagram showing one example of a signal processing system in the case where a reproducing apparatus constructing the content reproducing system in the embodiment is a digital television broadcast receiver.

FIG. 2 shows one example of a signal processing system of the reproducing apparatus 12. FIG. 2 assumes the case where the reproducing apparatus 12 is the digital television broadcast receiver. That is, a digital television broadcast signal received by an antenna 18 is supplied to a tuner part 20 through an input terminal 19 to thereby select a broadcast signal of a desired channel.

The broadcast signal in which the channel is selected by this tuner part 20 is supplied to a demodulation decoding part 21 and is restored to a digital video signal, a digital sound signal, etc. and then is outputted to a signal processing part 22. This signal processing part 22 performs predetermined digital signal processing with respect to each of the digital video signal and the digital sound signal supplied from the demodulation decoding part 21.

Then, this signal processing part 22 outputs the digital video signal to a synthesis processing part 23, and outputs the digital sound signal to a sound processing part 24. The synthesis processing part 23 of these parts superimposes an OSD (on screen display) signal on the digital video signal supplied from the signal processing part 22, and outputs the signal.

The digital video signal outputted from this synthesis processing part 23 is supplied to a video processing part 25, and is converted into an analog video signal of a format capable of display by a video display part 26 of a subsequent stage. Then, the analog video signal outputted from this video processing part 25 is supplied to the video display part 26 to perform video display.

Also, the sound processing part 24 converts the inputted digital sound signal into an analog sound signal of a format capable of reproduction by a speaker 27 of a subsequent stage. Then, the analog sound signal outputted from this sound processing part 24 is supplied to the speaker 27 to thereby perform sound reproduction.

Here, in this reproducing apparatus 12, a controller 28 performs centralized control of various operations including various receiving operations described above. A CPU (central processing unit) 28*a* is built into this controller 28, and the controller 28 respectively controls each of the parts so as to reflect the manipulation content by receiving manipulation information from a manipulating part 29 formed in a body of the reproducing apparatus 12 or manipulation information sent from a remote controller 30 and received by a receiving part 31. In addition, the controller 28 may operate by various processors (microcomputers) operating by, for example, dedicated firmware as well as a general-purpose CPU.

In this case, the controller 28 uses a memory 28*b*. This memory 28*b* mainly has ROM (read only memory) for storing a control program executed by the CPU 28*a*, RAM (random access memory) for providing the CPU 28*a* with a work area, and nonvolatile memory for storing various pieces of setting information, control information, etc.

Also, an HDD (hard disk drive) 32 is connected to this controller 28. This controller 28 can perform control so that a digital video signal and a digital sound signal obtained from the signal processing part 22 are recorded on the HDD 32 based on a manipulation of the remote controller 30 or the manipulating part 29 by a user.

Further, this controller 28 can perform control so as to subsequently perform the video display and the sound reproduction described above by reading the digital video signal and the digital sound signal out of a hard disk 32*a* by the HDD 32 based on the manipulation of the remote controller 30 or the manipulating part 29 by the user and decoding the signals and then supplying the signals to the signal processing part 22.

Also, a network interface 33 is connected to this controller 28. This network interface 33 is connected to the network 16. As a result, the controller 28 can conduct information communication by accessing the license server 13, the content server 14 and the accounting server 15 through the network interface 33 and the network 16 based on the manipulation of the remote controller 30 or the manipulating part 29 by the user. Also, the controller 28 has a function of executing a browser application, and can access various web pages using the browser application.

Further, a media interface 34 is connected to this controller 28. The removable media 17 can be connected to this media interface 34. As a result, the controller 28 can conduct information communication with the removable media 17 through the media interface 34 based on the manipulation of the remote controller 30 or the manipulating part 29 by the user.

Figure 3:
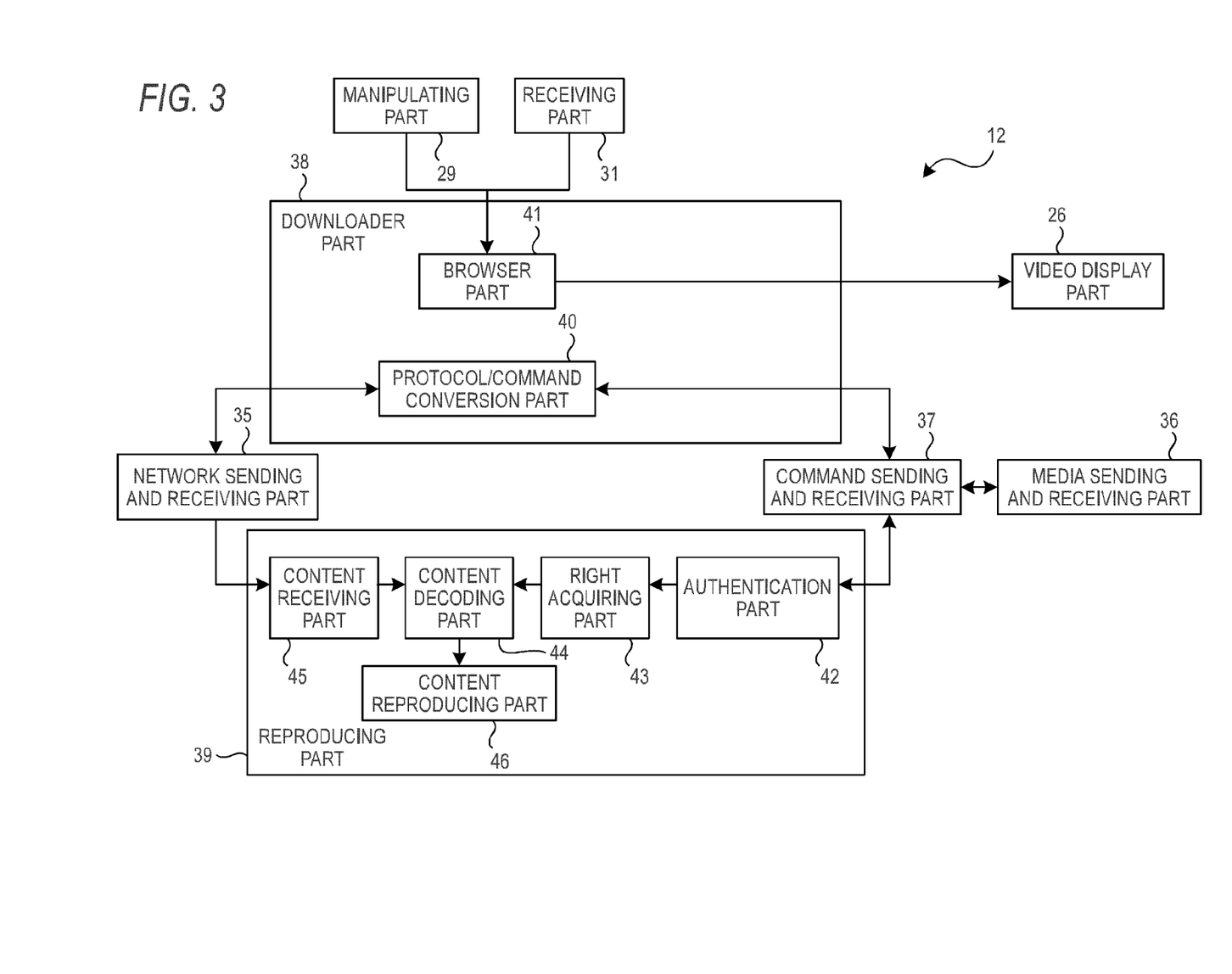
FIG. 3 is a block configuration diagram showing one example of a functional block of the reproducing apparatus constructing the content reproducing system in the embodiment.

FIG. 3 shows one example of a signal processing system of the reproducing apparatus 12 as a functional block. That is, the reproducing apparatus 12 includes a network sending and receiving part (corresponding to the network interface 33) 35 for making connection to the network 16 as described above. Also, the reproducing apparatus 12 includes a media sending and receiving part (corresponding to the media interface 34) 36 for making connection to the removable media 17.

Here, it is assumed that the removable media 17 is, for example, an SD memory card. At the time of sending to the removable media 17, the reproducing apparatus 12 generates a data packet etc. of command data in a command sending and receiving part 37 and sends the data packet etc. to the removable media 17 through the media sending and receiving part 36. Also, at the time of receiving from the removable media 17, a data packet of data and a response received through the media sending and receiving part 36 are interpreted.

The reproducing apparatus 12 can be broadly divided into a downloader part 38 and a reproducing part 39. The downloader part 38 is the portion for making protocol/command conversion for associating a protocol of the side of the network 16 with a command sent and received to the removable media 17 at the time of communication of authentication etc. of the license server 13 and the content server 14, and the removable media 17. Also, the downloader part 38 may include a browser part 41 for browsing a web page. In addition, the browser part 41 corresponds to the browser application described in FIG. 2.

In the downloader part 38, a protocol/command conversion part 40 makes protocol/command conversion. That is, since a payload of a packet used in communication of authentication etc. is the same but packet formats containing in order to send and receive the packet differ, the protocol/command conversion is required and the data itself sent and received is the same.

The browser part 41 receives a web page from the content server 14, and generates various images (GUI) based on data of the web page. Then, the browser part 41 outputs the generated images to the video display part 26 to display the images. In addition, FIG. 3 omits various blocks capable of being present between the browser part 41 and the video display part 26. Also, the browser part 41 accepts a user manipulation inputted from the manipulating part 29 and the receiving part 31. Then, the browser part 41 executes processing according to the accepted user manipulation. In addition, it may be said that data of the web page is an application program described by HTML etc. In other words, the browser part 41 requests an application program (data of the web page) from the content server 14, and acquires and executes the application program distributed according to the request.

The reproducing part 39 performs processing for reproducing content. When the processing for reproducing content is started, an authentication part 42 first performs authentication processing through the command sending and receiving part 37 with respect to the removable media 17. Here, the authentication part 42 and the removable media 17 respectively hold a certificate using public key cryptography, and perform mutual authentication.

After the mutual authentication succeeds, the authentication part 42 and the removable media 17 derive a session key by the same generating algorithm. The session key is possessed as a secret by the authentication part 42 and the removable media 17, respectively, and is used as an encryption key in the case of encryption in the case of conducting secret data communication between the authentication part 42 and the removable media 17. The session key is, for example, 128 bits of key data, and the cipher can use AES.

The authentication part 42 can read and write data in a secret area (Protected Area) of the removable media 17. In the case of reading out data present in the secret area of the removable media 17, the authentication part 42 issues a command for reading data out of the secret area of the removable media 17. Then, data is read out of the secret area of the inside of the removable media 17, and the data is encrypted by the session key described above. The encrypted data is read out through the media sending and receiving part 36, and is decoded in the authentication part 42 by the session key held by the authentication part 42.

Also, in the case of writing data in the secret area of the removable media 17, processing opposite to the above is performed. That is, when the data is encrypted by a session key in the authentication part 42 and a command for writing the data in the secret area of the removable media 17 is issued through the command sending and receiving part 37, the data is sent to the removable media 17 through the media sending and receiving part 36. In the removable media 17, the encrypted data is decoded using a session key held by the removable media 17, and its data is written in the secret area of the removable media 17.

A right acquiring part 43 is the portion for interpreting data read out of the removable media 17 and acquiring and interpreting a title key for decoding encrypted content and right information including a usage rule etc. in which license conditions of content are described. The license conditions etc. of content are described in the usage rule, and the right acquiring part 43 decides whether or not items of the number of reproductions, the number of copies available, a reproducible period, etc. are used in the range of license. In the case of deciding that the items are used in the range of license, the title key is taken out and is sent out to a content decoding part 44.

Also, the reproducing part 39 receives content from the content server 14 by a content receiving part 45. A URL indicating an address of content corresponding to an address of the content server 14 is described in the right information. The content receiving part 45 accesses the content server 14 based on this URL information and obtains the encrypted content.

An HTTP or an RTP (real time transport protocol) is used in a transfer protocol of the encrypted content between the content server 14 and the reproducing apparatus 12. The content receiving part 45 can receive the encrypted content at a speed according to a reproduction speed of content in the reproducing part 39. Also, according to trick reproduction such as a chapter jump or fast-forward reproduction, only the necessary portion can be received from the whole content.

The encrypted content received by the content receiving part 45 are sent to the content decoding part 44. Here, the encrypted content are decoded using the title key described above. Here, content are encrypted by, for example, a counter mode of AES. The encrypted content are decoded according to a predetermined format. The decoded content are reproduced by a content reproducing part 46.

Figure 4:
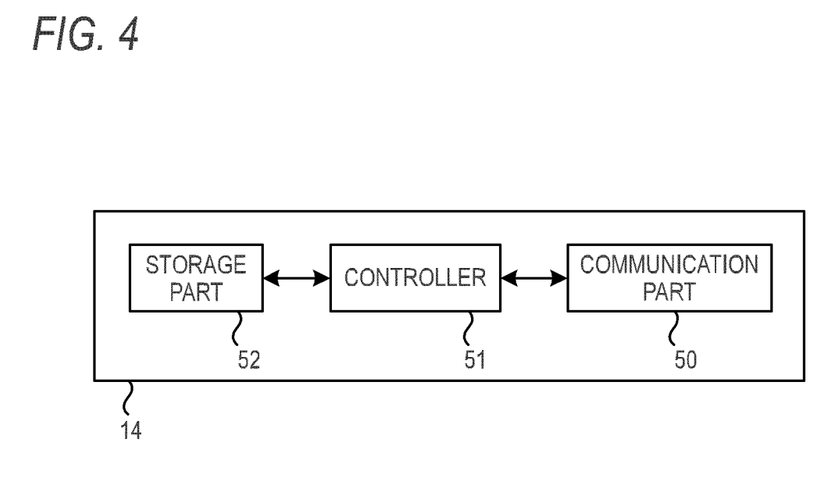
FIG. 4 is a block configuration diagram showing a configuration example of a content server in the embodiment.

FIG. 4 shows a configuration example of the content server 14. The content server 14 includes a communication part 50, a controller 51 and a storage part 52. The communication part 50 is a module for sending and receiving data to the network 16, and a data request specifying a URL is received from a device connected to the network 16. The storage part 52 stores, for example, data of a web page for providing moving image content such as a movie or information about the moving image content. A URL is assigned to each data. When a data request specifying a URL is received from a certain device, the controller 51 sends the data corresponding to the URL to the device. In addition, as described above, the accounting server 15 may have a function of storing and delivering data of a web page. That is, the accounting server 15 may have a configuration equivalent to that of the communication part 50, the controller 51 and the storage part 52. Or, other servers may store and deliver data of a web page.

Figure 5:
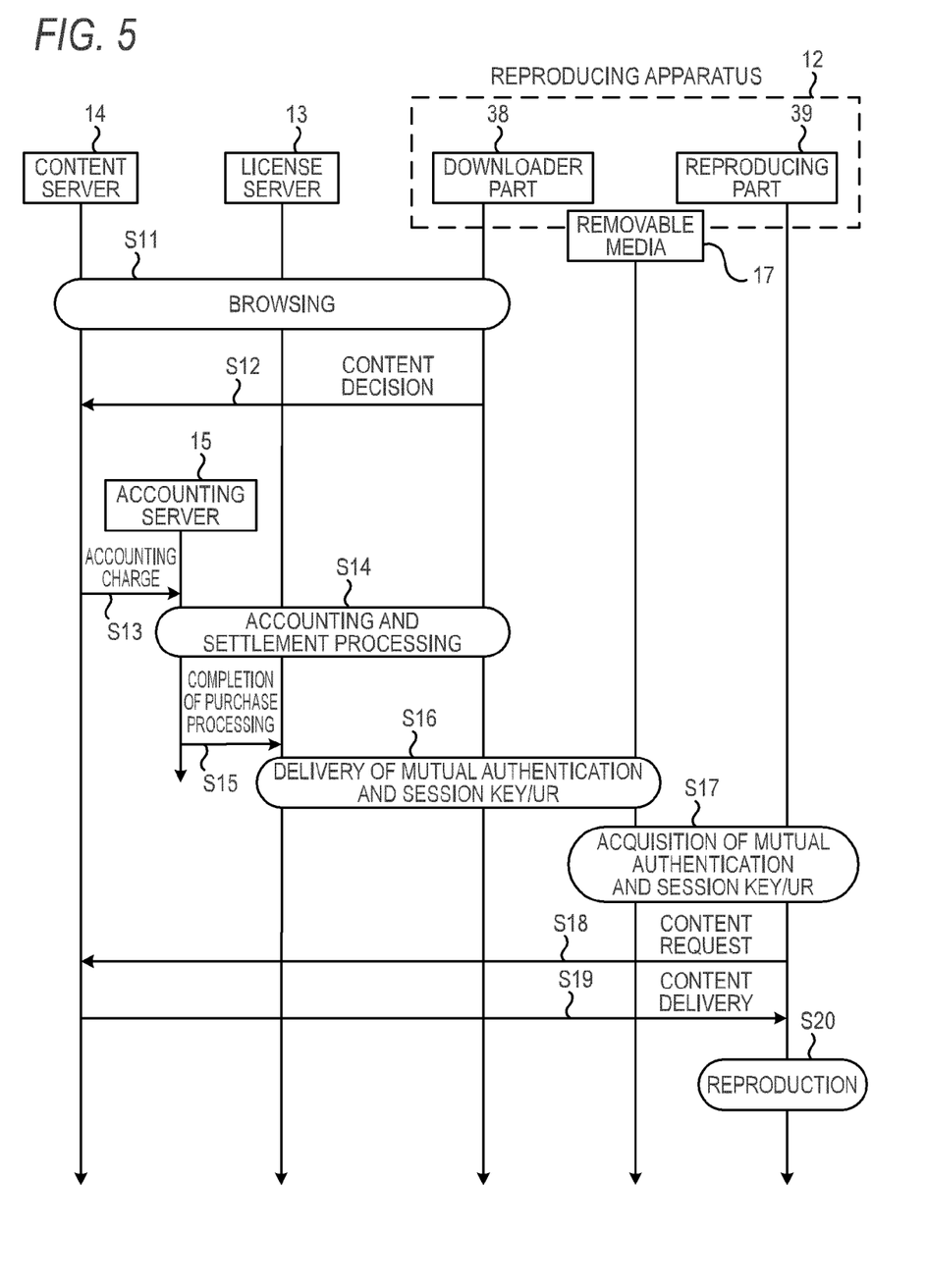
FIG. 5 is a diagram showing one example of a streaming reproduction sequence performed by the content reproducing system in the embodiment.
Figure 6:
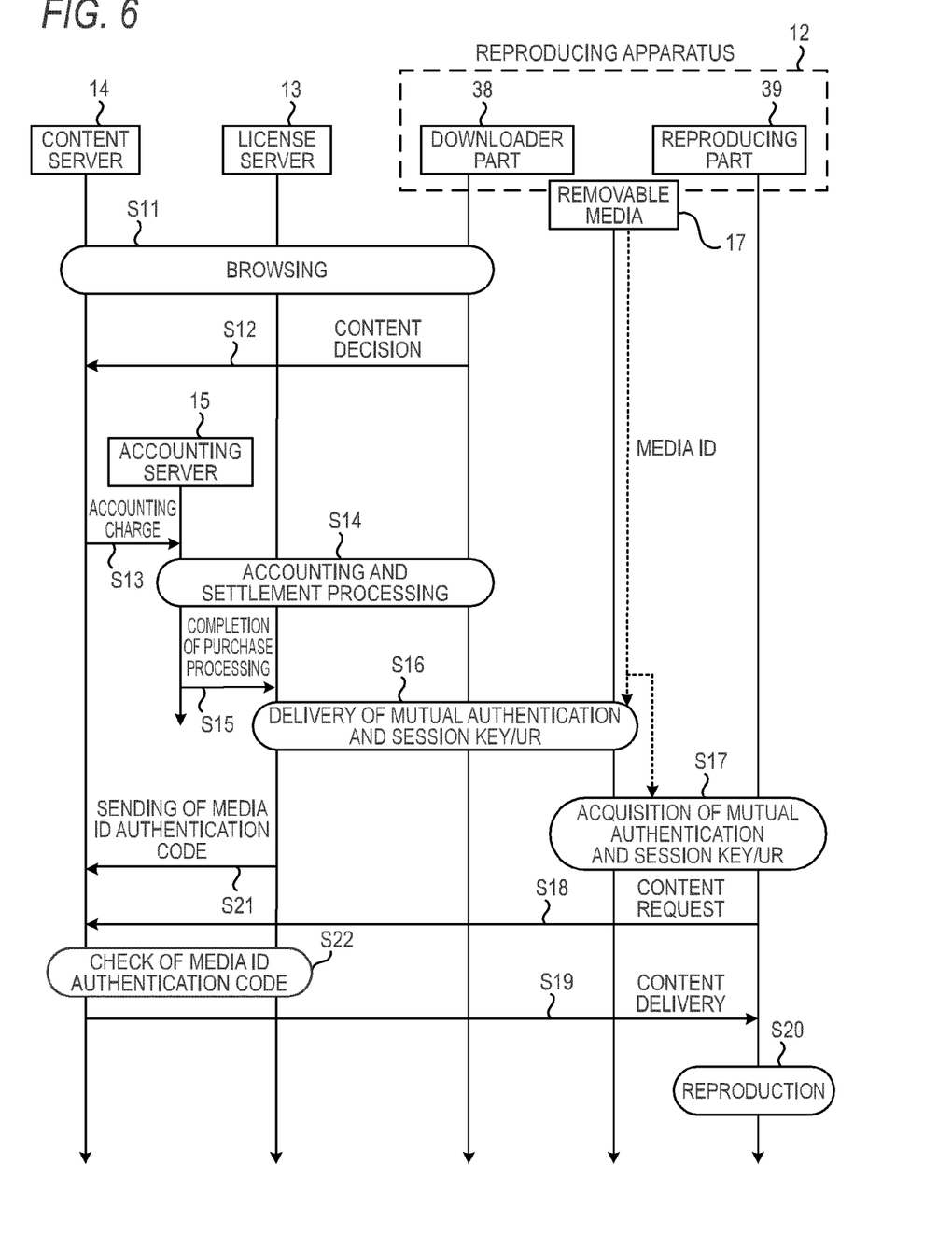
FIG. 6 is a diagram showing another example of the streaming reproduction sequence performed by the content reproducing system in the embodiment.
Figure 7:
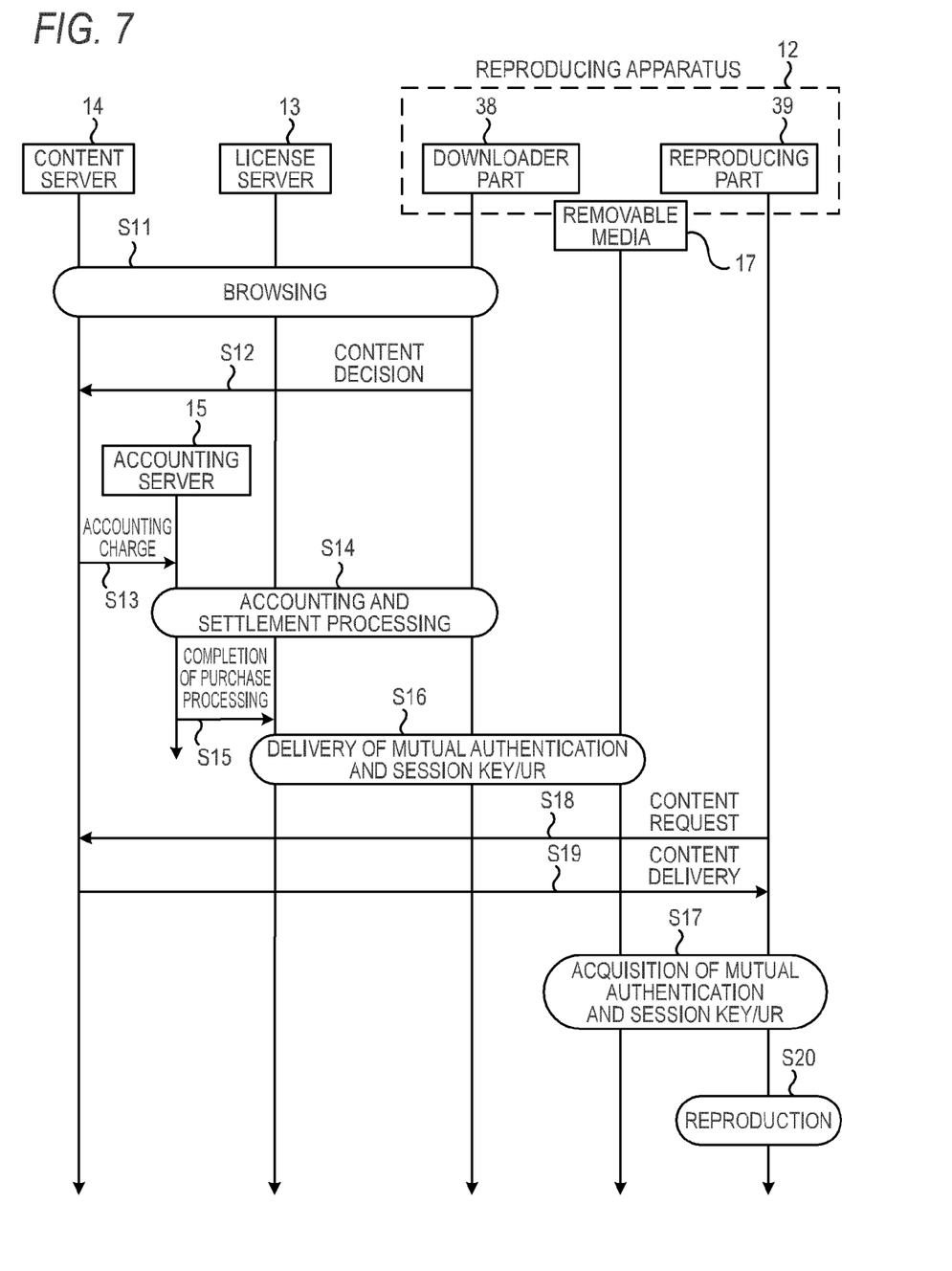
FIG. 7 is a diagram showing a further example of the streaming reproduction sequence performed by the content reproducing system in the embodiment.

FIGS. 5 to 7 show one example of a streaming reproduction sequence using the removable media 17. In addition, any flow of FIGS. 5 to 7 can be defined in the future in a predetermined part of a standard document of predetermined standards. In other words, the content reproducing system 11 executes any processing of FIGS. 5 to 7 according to a predetermined agreement decided in the future by a standards association. A component includes four parts of the content server 14, the accounting server 15, the license server 13 and the reproducing apparatus 12 described in FIG. 1, and processing of the reproducing apparatus 12 is further divided into the downloader part 38 and the reproducing part 39. Also, the removable media 17 are connected to the reproducing apparatus 12.

First, in step S11, the downloader part 38 of the reproducing apparatus 12 communicates with the content server 14 to select content to be viewed from now. The content server 14 presents a list of available content to the downloader part 38 of the reproducing apparatus 12. In addition, the downloader part 38 displays a web page including the list of content using, for example, the browser part 41, and selects the content according to a user manipulation input to its page. A display configuration of the web page is described in FIG. 9.

Then, in step S12, the downloader part 38 notifies the content server 14 of the content, whose viewing is decided, selected from the list by the user.

Then, in step S13, the content server 14 performs accounting processing on the content requested from the user. That is, the content server 14 charges the accounting server 15 an accounting of the requested content.

Subsequently, when accounting and settlement processing for the user is completed without any problem between the accounting server 15 and the downloader part 38 in step S14, the license server 13 is notified of the completion of purchase processing from the accounting server 15 in step S15.

Here, in step S16, the license server 13 generates right information for the removable media 17 connected to the reproducing apparatus 12. When content are previously encrypted inside the content server 14, key data for decoding the content is transferred from the content server 14 to the license server 13. The license server 13 generates data as right information by gathering the key data, a usage rule in which license conditions of the content purchased by the user are described, and a URL indicating a place of storage of the content.

In addition, in the case of including the content URL in the right information, the license server 13 may have, for example, a table associated with the URL every content identifier. Then, by including the content identifier in notification of the completion of purchase processing and accounting charge, the license server 13 can identify the content identifier and identify the content URL to be sent to the removable media 17. Also, for example, the accounting server 15 may send the URL to the reproducing apparatus 12 in step S15.

Subsequently, the license server 13 indirectly communicates with the removable media 17 through the downloader part 38 of the reproducing apparatus 12. The license server 13 directly communicates with the downloader part 38 of the reproducing apparatus 12, but the downloader part 38 converts a protocol into a command of the removable media 17 and thereby, the license server 13 indirectly communicates with the removable media 17.

In the case of its communication, the license server 13 and the removable media 17 perform mutual authentication. FIG. 3 describes a procedure in which the reproducing apparatus 12 and the removable media 17 perform mutual authentication, and the license server 13 plays a role equivalent to that of the reproducing apparatus 12 herein and thereby, equivalent mutual authentication can be performed.

That is, the license server 13 can read and write data in the secret area of the removable media 17. Like the reproducing apparatus 12, the license server 13 also holds a certificate of another public key system, and the license server 13 and the removable media 17 can perform mutual authentication.

In a stage of the completion of accounting processing, the downloader part 38 of the reproducing apparatus 12 starts a procedure in which the license server 13 and the removable media 17 perform mutual authentication. When the downloader part 38 notifies the license server 13 of the start of mutual authentication, data of the start of authentication is sent from the license server 13 as its response. The downloader part 38 converts the data into a command, and sends the command to the removable media 17.

The removable media 17 responds to its sending, and replies response data to the downloader part 38. The downloader part 38 converts its response data into a network protocol, and sends the protocol to the license server 13.

By repeating such a procedure, the license server 13 and the removable media 17 can perform mutual authentication while the downloader part 38 works as a bridge. When the mutual authentication succeeds, a session key shared by only the license server 13 and the removable media 17 is generated.

The right information described above is encrypted by its session key in the license server 13, and is sent to the removable media 17 through the downloader part 38. The removable media 17 receiving the encrypted right information decodes the right information using its session key inside the removable media 17, and writes the right information in its own secret area. In addition, the removable media 17 may write a title key in its own secret area and write a usage rule and a URL in its own normal storage area.

When step S16 is completed, the reproducing part 39 of the reproducing apparatus 12 and the removable media 17 perform mutual authentication in step S17. A procedure of this mutual authentication is shown in description of FIG. 3. In addition, a trigger of the start of this mutual authentication includes, for example, (1) the removable media 17 recognizes the completion of step S16 and notifies the reproducing part 39 of the start of mutual authentication, and (2) the license server 13 recognizes the completion of step S16 and notifies the reproducing part 39 of the start of mutual authentication, and (3) the license server 13 recognizes the completion of step S16 and notifies the downloader part 38 and the downloader part 38 notifies the reproducing part 39, and (4) the downloader part 38 monitors an exchange of data in S16 to thereby recognize the completion of S16 and notifies the reproducing part 39. When the mutual authentication succeeds between the reproducing part 39 (authentication part 42) and the removable media 17, a session key different from the above is shared by both of the reproducing part 39 and the removable media 17. The reproducing part 39 acquires right information from the removable media 17 using its session key.

Subsequently, the reproducing part 39 receives content from the content server 14 by the content receiving part 45. That is, since a URL indicating an address of the content corresponding to an address of the content server 14 is described in the right information as described above, the content receiving part 45 accesses the content server 14 based on this URL information in step S18, and obtains the encrypted content in step S19.

The encrypted content received by the content receiving part 45 are sent to the content decoding part 44 and are decoded using the title key described above. Subsequently, the decoded content are reproduced by the content reproducing part 46 in step S20.

FIG. 6 shows another example of the streaming reproduction sequence described in FIG. 5. In FIG. 6, description is made by assigning the same numerals to the same steps as those of FIG. 5. A media ID which is an identifier unique to individual media is written in the secret area of the removable media 17.

Hence, the license server 13 acquires a media ID from the removable media 17 in a procedure in which the license server 13 and the removable media 17 perform mutual authentication in step S16. Then, the license server 13 generates a media ID authentication code (right information is already delivered) which is a message authentication code (MAC) to the media ID using a title key as a key, and writes the code in the removable media 17.

Also, the reproducing part 39 acquires a media ID from the removable media 17 in a procedure in which the reproducing part 39 and the removable media 17 perform mutual authentication like the license server 13 in the case of acquiring a title key from the removable media in step S17 at the time of reproduction. Then, the reproducing part 39 generates a media ID authentication code which is a message authentication code (MAC) to the media ID using a title key as a key like the license server 13 using the acquired media ID and a title key capable of being acquired after the mutual authentication succeeds, and verifies whether or not its code is equal to a media ID authentication code recorded on the removable media 17. When this verification succeeds, the reproducing part 39 can decode the encrypted content using its title key.

That is, after accounting processing of content is completed and right information is written from the license server 13 into the removable media 17, a media ID authentication code is sent from the license server 13 to the content server 14 as shown in step S21. Also, when the reproducing part 39 requests content from the content server 14 in step S18, a media ID authentication code is sent simultaneously.

Then, the content server 14 checks whether or not the media ID authentication code is registered in the content server 14 in order to check whether or not a request source of content already holds right information as shown in step S22. When its check is obtained, the content server 14 gradually starts streaming delivery of content, and when the check is not obtained, the streaming delivery of content is not started and an error is replied. Accordingly, it can be checked whether or not the content are requested after the right information is previously acquired. When the right information is not acquired in the reproducing part 39, this inhibition can protect resources of the network 16.

FIG. 7 shows a further example of the streaming reproduction sequence described in FIG. 5. In FIG. 7, description is made by assigning the same numerals to the same steps as those of FIG. 5, and processing (step S18) in which the reproducing part 39 requests content from the content server 14 is performed before processing (step S17) in which the reproducing part 39 acquires right information from the removable media 17.

That is, since the encrypted content are a huge file, about several minutes to several tens of minutes are required by the time when data enough to be able to perform reproduction processing is accumulated. On the other hand, since the time taken to acquire right information from the removable media 17 is about several seconds, processing for acquiring content is first started and simultaneously with this, processing for acquiring right information is performed so that reproduction can be started as soon as possible and thereby, the time taken to start the reproduction of content can be reduced.

In addition, processing for checking a media ID authentication code described in FIG. 6 can be added to the streaming reproduction sequence shown in FIG. 7.

Also, it is contemplated to associate a settlement state of content with a media ID of the removable media 17 as a distribution destination of right information and save the settlement state and the media ID in the license server 13.

When this is done, since the media ID of the removable media 17 providing the right information in the past is stored in the license server 13 even when the removable media 17 is initialized and the right information is eliminated, it can be recognized as a request from the removable media 17 holding the same media ID in the case of mutual authentication, with the result that the right information can again be provided for its removable media 17 without another accounting and settlement processing.

Further, it is contemplated to be constructed so that plural media IDs can be registered in one account of an end user of the license server 13. When this is done, in the case of receiving a request for right information from the removable media 17 holding any of the plural media IDs registered in the license server 13, it is considered that the right information is already downloaded, and the right information can again be provided for its removable media 17 without another accounting and settlement processing.

Figure 8:
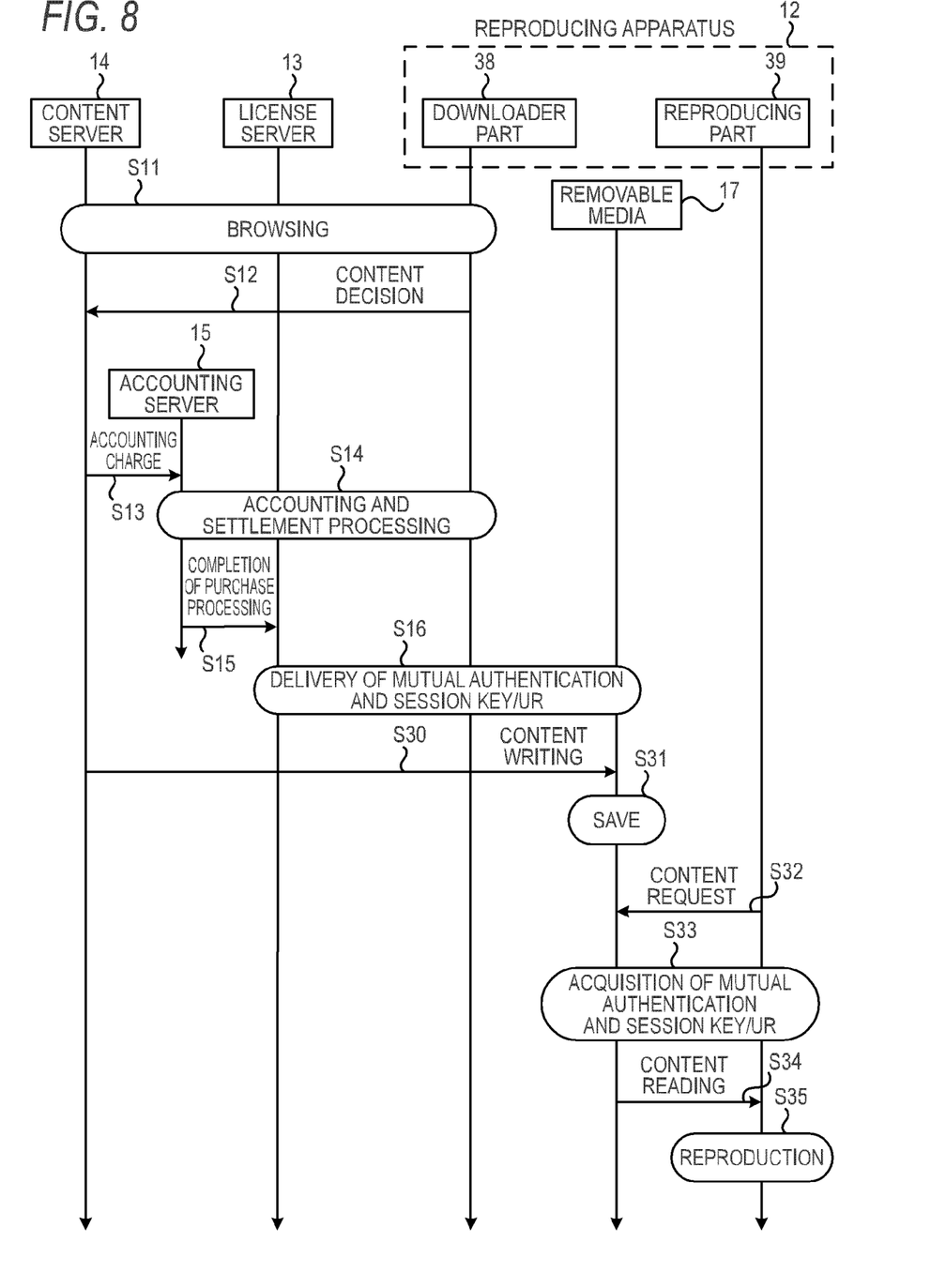
FIG. 8 is a diagram showing one example of reproduction processing and download processing performed by the content reproducing system in the embodiment.

FIG. 8 shows one example of reproduction processing and download processing using the removable media 17. In addition, a flow of FIG. 8 can be defined in a predetermined part of a standard document of predetermined standards. In other words, the content reproducing system 11 executes processing of FIG. 8 according to a predetermined agreement decided in the future by a standards association. In addition, the flow of FIG. 8 may be defined inside the same standard document as the standards defined in FIGS. 5 to 7. In FIG. 8, description is made by assigning the same numerals to the same steps as those of FIG. 5. The removable media 17 writes right information in its own secret area in step S16 as described above. Then, in step S30, the removable media 17 downloads encrypted content from the content server 14, and writes the encrypted content in its own non-secret area, and saves the content. In addition, in the case of downloading the encrypted content, the reproducing apparatus 12 sends a content request specifying a URL, and this URL may be sent from, for example, the accounting server 15 in step S15, or the license server 13 in step S16.

After saving the content, the removable media 17 may be connected to an apparatus other than the reproducing apparatus 12, and when the reproducing apparatus 12 receives a reproduction request, the following processing is executed. When a content request is received from the reproducing part 39 in step S32, the removable media 17 starts mutual authentication in step S33. After the mutual authentication, the reproducing part 39 reads a title key and a usage rule written in the removable media 17. Then, the reproducing part 39 reads encrypted content in step S34, and decodes and reproduces the encrypted content by the title key in step 35.

FIG. 9 shows a screen configuration example of a web page delivered by the content server 14 and displayed on the video display part 26 by the reproducing apparatus 12. In addition, these web pages are displayed in the case of browsing in, for example, steps S11 of FIGS. 5 to 8.

Figure 9A:
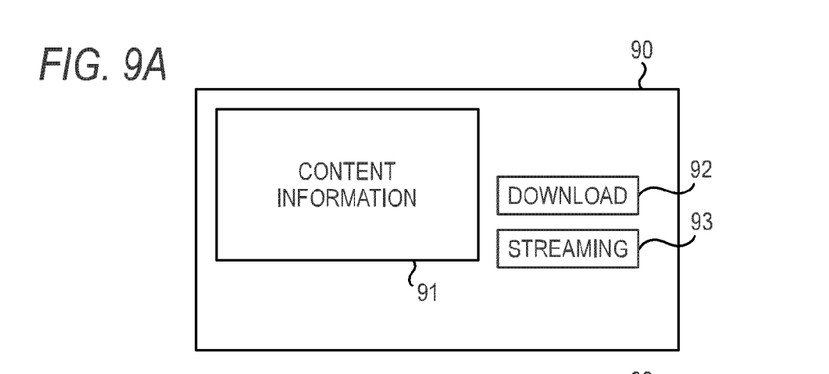
FIGS. 9A, 9B, 9C and 9D are diagrams showing examples of a screen configuration of a web page provided by the content reproducing system in the embodiment.

In FIG. 9A, an introduction image 91, a download button 92 and a streaming button 93 are arranged inside a screen 90. The introduction image 91 is an image for introducing moving image content, and is, for example, an introduction document or an introduction movie. The download button 92 is a button for downloading the moving image content. When the download button 92 is selected, the content reproducing system in the embodiment executes processing from S11 to S31 of FIG. 8. The streaming button 93 is a button for streaming and reproducing the moving image content. When the streaming button 93 is selected, any of the reproduction flows described in FIGS. 5 to 7 is executed.

Data of this web page is stored in, for example, the storage part 52 of the content server 14. The data of the web page includes image data of the introduction image 91, the download button 92 and the streaming button, arrangement data indicating arrangement positions inside a page of these images, and action data indicating an action generated in the case of accepting a manipulation input to these images. The action data includes a data code for sending content decision notification including a content identifier and a download request to the content server 14 according to a manipulation to the download button 92, and a data code for sending content decision notification including a content identifier and a streaming request to the content server 14 according to a manipulation to the streaming button. Then, when the browser part 41 of the reproducing apparatus 12 accesses the web page, the browser part 41 receives data of the web page, and generates an image of the screen 90 based on the data, and outputs and displays its image to the video display part 26.

Also, the browser part 41 determines that a manipulation to any image is accepted according to a user manipulation inputted from the manipulating part 29 and the receiving part 31, and executes processing according to the image accepting the manipulation. That is, when a manipulation to the download button 92 is accepted, the browser part 41 notifies the controller 28. And then, the controller 28 controls the downloader part 38 and the removable media 17 to execute processing of S11 and later so as to execute any reproduction flow described in FIG. 8. Similarly, when a manipulation to the streaming button 93 is accepted, the browser part 41 notifies the controller 28. And then, the controller 28 controls the downloader part 38, the reproducing part 39 and the removable media 17 to execute processing of S11 and later so as to execute any of the reproduction flows described in FIGS. 5 to 7.

Figure 9B:
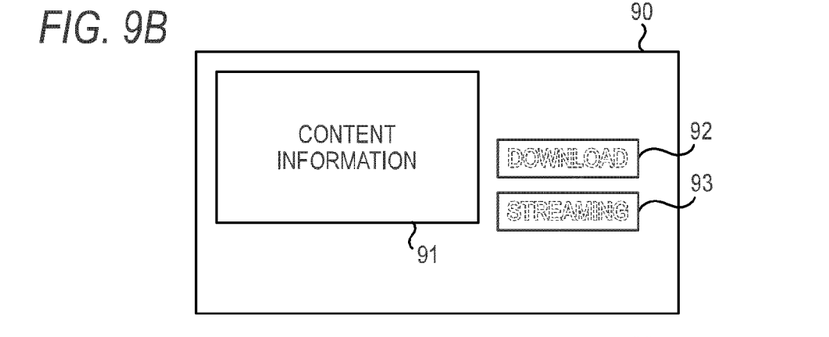
Figure 9C:
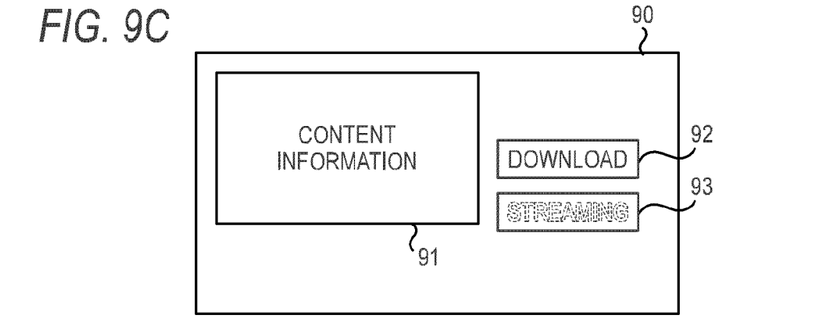

In examples of FIGS. 9B and 9C, one or both of the download button 92 and the streaming button 93 are, for example, grayed out. In this screen 90, the download button 92 is grayed out when the reproducing apparatus 12 cannot use download, and the streaming button 93 is grayed out when the reproducing apparatus 12 cannot use streaming.

As one technique for implementing display forms of FIGS. 9B and 9C, the content server 14 determines whether or not the reproducing apparatus 12 can use download and streaming, and delivers a web page in which the button corresponding to the function incapable of being used by the reproducing apparatus 12 is grayed out using, for example, a direct function.

As one technique for making the determination described above, the content server 14 acquires information indicating whether or not the reproducing apparatus 12 can use download in the embodiment and information indicating whether or not the reproducing apparatus 12 can use streaming in the embodiment from the reproducing apparatus 12. The content server 14 is notified of this information from the reproducing apparatus 12 as, for example, predetermined flag information.

Or, as another technique for making the determination described above, when a web page is accessed from the reproducing apparatus 12, the content server 14 requests the reproducing apparatus 12 and the removable media 17 to start mutual authentication of the license server 13 and the removable media 17, and when a result of the authentication succeeds, it is decided that download can be used. In addition, the result of this authentication may be acquired from any of the license server and the reproducing apparatus 12. Also, the content server 14 further requests mutual authentication of the removable media 17 and the reproducing part 39 from the reproducing apparatus 12 and the removable media 17, and when a result of the authentication succeeds and it is decided that download can be used by the decision described above, it is decided that streaming can be used.

As another technique for implementing the display forms of FIGS. 9B and 9C, the content server 14 may deliver data of a web page including a code controlled so as to change a display form of the download button 92 or the streaming button 93 according to a state as to whether or not the reproducing apparatus 12 copes with download or streaming of the embodiment.

Figure 9D:
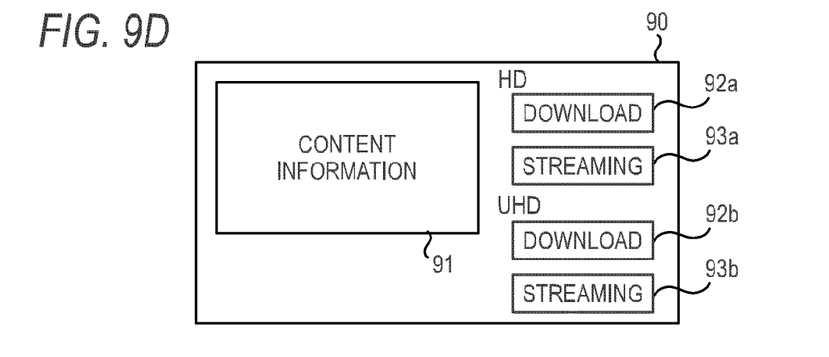

In an example of FIG. 9D, a download button and a streaming button are prepared every resolution of moving image content of a delivery target. In this example, a download button 92a and a streaming button 93a are arranged for a manipulation of acquiring content of HD resolution, and a download button 92b and a streaming button 93b are arranged for a manipulation of acquiring content of UHD resolution. Then, when the download button 92b or the streaming button 93b is selected, download processing or streaming processing described in the embodiment is executed. When the download button 92a or the streaming button 93a is selected, for example, processing in conformity with conventional content protection standards according to a procedure different from that of the embodiment is executed.

Since the embodiment described above is constructed so that right information is recorded on the removable media 17 and the reproducing apparatus 12 streams and reproduces the encrypted content while decoding the encrypted content delivered from the content server 14, the mass encrypted content can be prevented from being recorded on the removable media 17, with the result that deterioration of a recording element of the removable media 17 can be reduced and therefore, the life of the removable media 17 can be prevented from being decreased.

Also, after the license server 13 and the removable media 17 connected to the reproducing apparatus 12 directly perform mutual authentication, right information is downloaded and recorded on the removable media 17. As a result, it is unnecessary for the reproducing apparatus 12 to hold secret information necessary to download the right information from the license server 13, and the right information can be downloaded from the license server 13 to the removable media 17 by a protection module of one method.

Further, the reproducing apparatus 12 and the removable media 17 perform mutual authentication and thereby, the reproducing apparatus 12 can acquire right information even when the reproducing apparatus 12 and the license server 13 do not perform mutual authentication directly. As a result, the right information can be saved in the removable media 17 offline.

Also, the reproducing apparatus 12 may acquire right information without recording the right information on the removable media 17. Concretely, after the license server 13 and the removable media 17 perform mutual authentication, the reproducing apparatus 12 holds the right information. Thereafter, the reproducing apparatus 12 and the removable media 17 perform mutual authentication, and a key for decoding the held right information is obtained. The reproducing apparatus 12 decodes the right information by the key, and obtains and reproduces encrypted content. In other words, it is herein constructed so that the removable media 17 functions as physical media for authentication without recording the right information as well as the encrypted content on the removable media 17.

In addition, this invention is not limited to the embodiment itself described above, and components can variously be modified and embodied without departing from the gist of the invention in the stage of implementation. Also, various inventions can be formed by properly combining plural components disclosed in the embodiment described above. For example, several components may be eliminated from all the components shown in the embodiment. Further, components related to different embodiments may be combined properly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising:
   a connecting controller configured to control a connection to removable media having a content protection function;
   a communicator controller configured to receive data of a web page from a web server, the web page comprising a first object to start download processing of a first content and a second object to start streaming processing of a second content;
   a display controller configured to display the web page and to play the first content or the second content on a display;
   a hardware processor coupled to a memory configured to execute instructions stored in the memory, configured to:
   receive a first input made by a manipulation of the first object or a second input made by a manipulation of the second object;
   start the download processing in response to a reception of the first input; and
   start the streaming processing in response to a reception of the second input,
   wherein the download processing comprises:
   first processing comprising that the removable media obtains a first mutual authentication from a license server through the communicator controller;
   second processing comprising that, when the first mutual authentication is successful, the removable media receives a first title key from the license server through the communicator controller and write said first title key in own recording area; and
   third processing comprising that the removable media receives first encrypted content from a content server through the communicator controller and write said first encrypted content in the own recording area, and
   wherein the streaming processing comprises:
   fourth processing comprising that the removable media obtains a second mutual authentication from the license server through the communicator controller;
   fifth processing comprising that, when the second mutual authentication is successful, the removable media receives a second title key and a content address from the license server through the communicator controller and write said second title key and said content address in the own recording area;
   sixth processing comprising that the removable media and the display controller perform a third mutual authentication;
   seventh processing comprising that, when the third mutual authentication is successful, the display controller acquires the second title key and the content address recorded on the removable media;
   eighth processing comprising that the display controller streams and receives second encrypted content from the content server using the content address; and
   ninth processing comprising that the display controller decodes the streamed-and-received second encrypted content using the second title key, and streams and plays the decoded second encrypted content while decoding the second encrypted content from the license server.

2. The display control apparatus of claim 1, further comprising:
   a conversion controller configured to associate a protocol of the license server with a command with respect to the removable media.

3. The electronic apparatus of claim 1,
   wherein the electronic apparatus sends a media ID authentication code derived from a title key of content and a media ID described in the removable media in the case of acquiring encrypted content from the content server in the eighth processing.

4. A display control method executed in an electronic apparatus which comprises a connecting controller for controlling a connection to removable media having a content protection function, a display controller for displaying a web page and to play a first content or a second content on a display, and a hardware processor coupled to a memory configured to execute instructions stored in the memory, and which outputs video to the display, the display control method comprising:
   receiving data of the web page from a web server to a communicator, the web page comprising a first object to start download processing of a first and a second object to start streaming processing of a second content;
   receiving a first input made by a manipulation of the first object or a second input made by a manipulation of the second object;
   starting the download processing in response to a reception of the first input; and
   starting the streaming processing in response to a reception of the second input,
   wherein the download processing comprises:
   first processing comprising that the removable media obtains a first mutual authentication from a license server through the communicator;
   second processing comprising that, when the first mutual authentication is successful, the removable media receives a first title key from the license server through the communicator and write said first title key in own recording area; and
   third processing comprising that the removable media receives first encrypted content from a content server through the communicator and write said first encrypted content in the own recording area, and the streaming processing comprises:

fourth processing comprising that the removable media obtains a second mutual authentication from the license server through the communicator;

fifth processing comprising that, when the second mutual authentication is successful, the removable media receives a second title key and a content address from the license server through the communicator and write said second title key and said content address in the own recording area;

sixth processing comprising that the removable media and the display controller perform a third mutual authentication;

seventh processing comprising that, when the third mutual authentication is successful, the display controller acquires the second title key and the content address recorded on the removable media;

eighth processing comprising that the display controller streams and receives second encrypted content from the content server using the content address; and ninth processing comprising that the display controller decodes the streamed-and-received second encrypted content using the second title key, and streams and plays the decoded second encrypted content while decoding the second encrypted content from the license server.

5. The display control method of claim 4, further comprising: associating a protocol of the license server with a command to the removable media.

6. The display control method of claim 4, further comprising:

sending a media ID authentication code derived from a title key of content and a media ID described in the removable media in the case of acquiring encrypted content from the content server in the eighth processing.

7. A system comprising one or more servers for providing a graphical user interface and content, comprising:

a first storage configured to store data of a web page comprising a first object to start download processing of a first content and a second object to start streaming processing of a second content;

a communicator controller configured to receive a request for access to the web page from a terminal device, the terminal device comprising:

a connecting controller configured to control a connection to removable media comprising a content protection function, a first transmitter configured to send the data of the web page to the terminal device via according to the request for access;

a second storage configured to store first and second encrypted content; and a second transmitter configured to send the first or second encrypted content to said terminal device according to a content request sent from the terminal device, wherein the download processing comprises:

first processing comprising that the removable media obtains a first mutual authentication from a license server through the communicator controller;

second processing comprising that, when the first mutual authentication is successful, the removable media receives a first title key from the license server through the communicator controller and write said first title key in own recording area; and third processing comprising that the removable media receives the first encrypted content sent from the second transmitter through the communicator controller and write said first encrypted content in the own recording area, and the streaming processing comprises:

fourth processing comprising that the removable media obtains a second mutual authentication from the license server through the communicator controller;

fifth processing comprising that, when the second mutual authentication is successful, the removable media receives a second title key and a content address from the license server through the communicator controller and write said second title key and said content address in the own recording area;

sixth processing comprising that the removable media and a display controller perform a third mutual authentication;

seventh processing comprising that, when the third mutual authentication is successful, the display controller acquires the second title key and the content address recorded on the removable media;

eighth processing comprising that the display controller accesses a server system using the content address and streams and receives second encrypted content sent from the second transmitter; and ninth processing comprising that the display controller decodes the streamed-and-received second encrypted content using the second title key, and streams and plays the decoded second encrypted content while decoding the second encrypted content from the license server.

* * * * *